(12) United States Patent
Kinkel

(10) Patent No.: US 10,054,132 B2
(45) Date of Patent: Aug. 21, 2018

(54) FLOW-DIRECTING MOTOR MOUNT

(71) Applicant: UNITED METAL PRODUCTS, INC., Tempe, AZ (US)

(72) Inventor: Stephen W. Kinkel, Phoenix, AZ (US)

(73) Assignee: United Metal Products, Inc., Tempe, AZ (US)

( * ) Notice: Subject to any disclaimer, the term of this patent is extended or adjusted under 35 U.S.C. 154(b) by 0 days.

(21) Appl. No.: 15/440,936

(22) Filed: Feb. 23, 2017

(65) Prior Publication Data

US 2017/0241441 A1 Aug. 24, 2017

Related U.S. Application Data

(60) Provisional application No. 62/298,750, filed on Feb. 23, 2016.

(51) Int. Cl.
*F16M 11/00* (2006.01)
*F04D 29/64* (2006.01)
*F04D 25/06* (2006.01)
*F04D 25/08* (2006.01)
*H02K 5/26* (2006.01)

(52) U.S. Cl.
CPC ............ *F04D 29/644* (2013.01); *F04D 25/06* (2013.01); *F04D 25/08* (2013.01); *H02K 5/26* (2013.01)

(58) Field of Classification Search
CPC ............ F04D 25/08; F04D 25/06; H02K 5/26
See application file for complete search history.

(56) References Cited

U.S. PATENT DOCUMENTS

| | | | | |
|---|---|---|---|---|
| 3,790,114 A | * | 2/1974 | Italiano | F04D 29/646 248/672 |
| 4,394,111 A | * | 7/1983 | Wiese | F24F 13/20 165/122 |
| 6,478,838 B2 | * | 11/2002 | McSweeney | F24F 3/16 248/603 |
| 2008/0078340 A1 | * | 4/2008 | Havel | F04D 29/526 123/41.49 |

* cited by examiner

*Primary Examiner* — Amy J. Sterling
(74) *Attorney, Agent, or Firm* — Schmeiser, Olsen & Watts, LLP

(57) ABSTRACT

Disclosed is a flow-directing motor mount for a motor mounted within the flow stream of a moving air. A flow-directing motor mount is described. Embodiments of the flow-directing motor mount cause a change in the direction of flow of a air stream constrained by a air intake cone or baffle and flowing through a HVAC device, such as a fan of an air-handler assembly. The change in direction of flow creates an angular momentum in the air stream in the direction of rotation of a fan, increasing the overall operating efficiency of the HVAC device. By increasing the operating efficiency, the air resistance created by the flow-directing motor mount supports coupling a motor to the HVAC device is offset, enabling the HVAC device to operate at a higher efficiency.

16 Claims, 5 Drawing Sheets

FLOW-DIRECTING MOTOR MOUNT

CROSS REFERENCE TO RELATED APPLICATION[S]

This application claims priority to U.S. Provisional Patent Application entitled "FLOW-DIRECTING MOTOR MOUNT," Ser. No. 62/298,750, filed Feb. 23, 2016, the disclosure of which is hereby incorporated entirely herein by reference.

BACKGROUND OF THE INVENTION

Technical Field

This invention relates to motor mounts. In particular, the invention relates to a flow-directing motor mount for HVAC devices.

State of the Art

Heating, ventilation, and air conditioning ("HVAC") systems employ motors to power fans to cause flow of air through a variety of devices, including ductwork, evaporative coolers, cooling fans for computers and electronics, and the like. A motor powering such a device must be attached to a stable structure, often including the HVAC device, by a mounting appliance. This mounting appliance, such as a motor mount, mounting bracket, or the like, must perform the fundamental function of stabilizing the motor in position relative to the HVAC device. The motor mount should also eliminate or minimize transmission of vibrations arising from the motor to the device or equipment powered by the motor. Additionally, in the case of motors and motor mounts placed within a fluid stream such as within the air intake baffle of a fan assembly, for example, the motor mount must not substantially impede the flow of air flowing through the baffle.

Regarding mounts for electrical motors, currently available motor mounts are standardized to fit National Electrical Manufacturer's Association ("NEMA")-sized motor frame bases pursuant to industry-standard construction. With respect to electrical motors which power fans within air-handling equipment, these constraints only allow for certain configurations and limit the position of the fan relative to the motor. Because newly-developed blower assemblies, fan shrouds/baffles, and related equipment must be manufactured within these constraints, the length of time and manufacturing costs for newly developed air-handling equipment is increased.

Problems exist, however, with motor mounts known in the art. Motor mounts lacking substantial supports or related coupling and stabilizing structures are more likely to generate harmonic resonant vibrations between the motor and the HVAC device, damaging the device and the motor. Additionally, when located within the fluid path of the HVAC device, the motor mount itself creates resistance to the flow of air through the fluid path, reducing the overall efficiency of the HVAC device.

Accordingly, there is a need in the field of motor mounts for an improved motor mount that directs flow of air into a HVAC device.

SUMMARY OF EMBODIMENTS OF THE INVENTION

Embodiments of the present invention include a flow-directing motor mount. The flow-directing motor mount creates a stable coupling between a motor and a HVAC device so as to prevent or minimize development of resonant vibration between the motor and the HVAC device. The flow-directing motor mount additionally creates favorable air dynamics within a baffle or similar structure by directing the flow of air through the device so as to increase the overall efficiency of the HVAC device.

An embodiment includes a flow-directing motor mount comprising a base; and a support coupled to the base, wherein the support comprises: a leading edge formed from a folded over portion of material; and a first flow director extending from the folded over portion, wherein the first flow director directs the flow of air through a baffle of a HVAC device.

Another embodiment includes a flow-directing motor mount comprising: a base; and a plurality of supports coupled to the base, wherein each support comprises: a leading edge formed from a folded over portion of material; and a first flow director extending from the folded over portion, wherein the first flow director directs the flow of air through a baffle of a HVAC device.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

Figure 1:
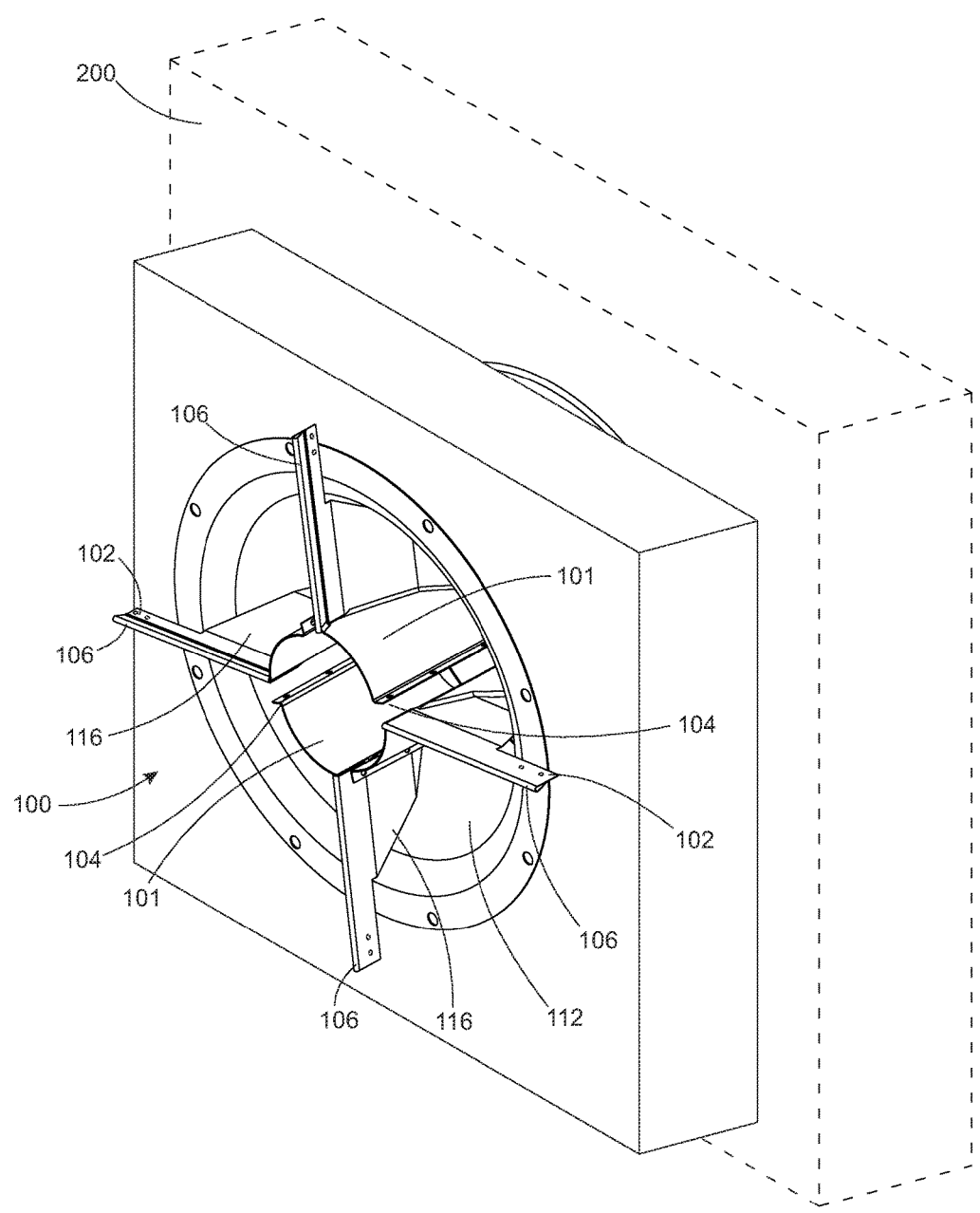
FIG. 1 is a perspective view of a flow-directing motor mount, in accordance with an embodiment.

As discussed above, the disclosed invention relates to a flow-directing motor mount for mounting a motor within a fluid stream, wherein the flow-directing motor mount causes a change in the direction of flow of the fluid stream. Wherein elements of the motor mount create a flow-directing effect to direct the fluid at an optimum angle incident to a fan blade within an air flow, the flow-directing motor mount increases the overall efficiency of the HVAC device.

Additionally, currently available motor mounts provide limited support for the motor powering the device. A poorly supported motor coupled to a HVAC device can allow the motor to move, vibrate, and transmit these vibrations to the HVAC device. Additionally, vibrations arising within the HVAC device may be transmitted through the motor mount to the motor. The combination of vibrations in the HVAC device and the motor may combine to create resonance, particularly when the position of the motor in relation to the position of the HVAC device is not rigidly fixed and even a small amount of movement between the two devices is possible. When such vibrations combine at a resonant frequency, the resulting greatly amplified periodic motion can damage or destroy components of the HVAC device, the motor, or both.

Adding additional mounts and/or supports to increase the rigidity of the coupling between the motor and the HVAC device creates resistance to air flow by increasing the cross-sectional area of the motor mounts normal to the direction of the air flow, therein increasing the resistance to air flow and decreasing the efficiency of the HVAC device.

Embodiments of the invention address these and other limitations by providing a dual-purpose motor mount which 1) couples a motor, such as an electrical motor, for example, located within a fluid stream to a HVAC device; and 2) causes a change in the direction of the fluid stream such that the incident angle of the fluid stream to a fan blade is optimized for generating flow augmentation with the least amount of power, therein creating an increase in efficiency of the HVAC device greater than any decrease in efficiency created by the presence of multiple mounting supports located within the fluid stream.

A detailed description of the hereinafter described embodiments of the disclosed device and method of use are presented herein by way of exemplification and not limitation with reference to the Figures. Although certain embodiments are shown and described in detail, it should be understood that various changes and modifications may be made without departing from the scope of the claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

FIG. 1 is a side view of a flow-directing motor mount. FIG. 1 shows a flow-directing motor mount 100. Flow-directing motor mount 100 may comprises a base 101 and a plurality of supports 102. In some embodiments, base 101 and supports 102 are formed as a unitary structure, while in other embodiments, supports 102 are detachably coupled to base 101. In embodiments where supports 102 are detachably coupled to base 101, supports 102 may be detachably coupled to base 101 using bolts, screws, or other suitable fastener. In other embodiments, supports 102 are coupled to base 101 by welding, annealing, use of adhesives, and the like. Further still, in embodiments where supports 102 and base 101 are formed as a unitary body, the unitary body may be made by injection molding, casting, or the like. In some embodiments, the material utilized in the formation of supports 102 and base 101 is a sheet metal, such as sheet steel or sheet aluminum, for example. In some embodiments, different metals or other dissimilar materials are used to form base 101 and supports 102, such as sheet steel for supports 102 and aluminum for base 101. In some embodiments, non-metals are used, such as plastics. The choice of materials used to form supports 102 and base 101 of flow-directing motor mount 100 are selected according to the intended end-application of flow-directing motor mount 100. Because motors come in an enormous variety and range of sizes, types, power levels, and other parameters, formation of flow-directing motor mount 100 is possible in a corresponding wide range of sizes using materials of different strength tolerances to match the intended application.

In some embodiments, base 101 is a structure which physically contacts the housing or other component of a motor, such as an electrical motor, for example, although this is not meant to be limiting. In the embodiment shown in FIG. 1, and in some other embodiments, base 101 comprises a sleeve of material which is coupled around the perimeter of a motor using an appropriate fastener, such as a screw or bolt. In some embodiments, other coupling devices may be used.

Support 102 is a structure operating to connect base 101 to a frame member, housing, or other structural element of a machine powered by a motor mounted in flow-directing motor mount 100. In some embodiments, support 102 is a rigid structure which couples motor mount 100 to a structure powered by the motor. Support 102 functions to fix base 101 of motor mount 100 in a position whereupon movement originating in a motor or a HVAC device does not create vibrations or similar movements at a resonant frequency. Such vibrations of movements may become amplified and cause damage to components of the motor, the powered structure, or a motor mounting structure. In some embodiments, therefore, motor mount 100 comprising a plurality of supports 102 provides a fixed coupling to more rigidly fix a motor coupled to motor mount 100 in position and dampen any resonant vibrations of movements arising from the motor, the HVAC device, or both the motor and the HVAC device.

Motor mount 100 is coupled to a HVAC device within a air intake cone, a baffle, or the like, in some embodiments. In these and some other embodiments, therefore, supports 102 are present within a fluid stream and present a cross-sectional area normal to the direction of flow of the fluid stream, creating resistance to flow. Therefore, although a greater number of supports 102 comprised by motor mount 100 provide increased dampening of resonant vibrations, the resistance to flow of the fluid stream is also increased, decreasing the overall operating efficiency of the HVAC device. Motor mount 100, in some embodiments, both dampens resonant vibrations or movements with a plurality of supports 102, in some embodiments, and additional elements discussed herein below offset a decrease in operating efficiency created by increased resistance to air flow from a plurality of supports 102 positioned in the fluid stream.

Regardless, the number of supports 102 comprising motor mount 100 achieves an optimal compromise between dampening of resonant vibrations and provision of maximum operating efficiency of the HVAC device, in some embodiments. The number of supports 102, therefore, is determined according to the end-application of motor mount 100, including such factors as the power requirements and motor size of the HVAC device, the degree of inherent vibration during operation of the HVAC device and the motor, and other relevant factors. In some embodiments, therefore, motor mount 100 comprises a single support 102. In some embodiments, motor mount 100 comprises two supports 102. In some embodiments, motor mount 100 comprises three supports 102. In some embodiments, motor mount 100 comprises four or more supports 102. In some embodiments, such as the example embodiment shown in FIG. 1, motor mount 100 comprises five supports 102. In some embodiments, motor mount 100 comprises ten or fewer supports 102. In some embodiments, motor mount 100 comprises greater than ten supports 102.

FIG. 1 additionally shows a support bracket 103 comprising a fastener hole 104, and a bracket angle 110. Support bracket 103, in some embodiments, is coupled to support 102 and comprises a fastener hole 104. Support bracket 103 is a point of coupling of motor mount 100 to the HVAC device. In the embodiments shown in FIG. 1, and in some other embodiments, support bracket 103 is coupled to support 102 with rivets. This is not meant to be limiting. In some embodiments, by way of non-limiting examples, support bracket 103 is coupled to support 102 with some other suitable fastener, such as a bolt, a screw, a clip, a clamp, and the like. In some embodiments, support bracket 103 is formed as an element of a unitary body comprising support 102 and support bracket 103. In some embodiments, support bracket 103 is irremovably coupled to support 102 by welding, annealing, use of adhesives, and the like. In some embodiments, support bracket 103 is removably coupled to support 102. Support bracket 103, in some embodiments, comprises fastener hole 104. In some embodiments, support bracket 103 comprises a single fastener hole 104. In some embodiments, support bracket 103 comprises a plurality of fastener holes 104. In some embodiments, support bracket 103 does not comprise fastener hole 104. Fastener hole 104 receives a suitable fastener, such as a bolt, a screw, a rivet, and the like, coupling support bracket 103 to an element of the HVAC device.

FIG. 1 shows a bracket angle 110 and a first flow director 116. Bracket angle 110 comprises an angle between a fastener hole 104 bearing segment of support bracket 103 and support 102, causing first flow director 116 to be positioned in a fluid stream at an angle incident to the direction of a subset of flow at a given location within the fluid stream. The incident angle of first flow director 116 to the direction of flow causes a change in the overall operating efficiency of the HVAC device coupled to motor mount 116 by changing the direction of flow of the fluid stream entering the HVAC device. In some embodiments, this change in efficiency is an increase in efficiency, which partially or completely cancels out the decrease in operating efficiency caused by resistance to flow created by the presence of supports 102 of motor mount 100 present within the fluid stream. Although FIG. 1 shows bracket angle 110 measuring about ninety (90) degrees, this not meant to be limiting. Bracket angle 110, in some embodiments, measures anywhere from about ninety (90) degrees to about thirty (30) degrees. In some embodiments, bracket angle 110 measures about forty-five (45) degrees.

First flow director 116 is coupled to support 102. In some embodiments, including the embodiment shown in FIG. 1, first flow director 116 is formed as a unitary body with support 102, however, this is not meant to be limiting. In some embodiments, first flow director 116 is movably coupled to support 102, wherein an angle of first flow director 116 incident to a direction of flow of the fluid stream is adjustable. In some embodiments, first flow director 116 is coupled to support 102. In some embodiments, first flow director 116 is removably coupled to support 102. In some embodiments, first flow director 116 is irreversibly coupled to support 102. In some embodiments, first flow director 116 and support 102 are formed from the same material, such as sheet steel in a non-limiting example. In some embodiments, first flow director 116 and support 102 are formed from dissimilar materials. For example, in some embodiments, support 102 comprises steel, aluminum, a metal alloy, or other metallic composition and first flow director 116 comprises a plastic material. In some embodiments, first flow director 116 is rigid or semi-rigid. In some embodiments, first flow director 116 is flexible or elastic.

Figure 2:
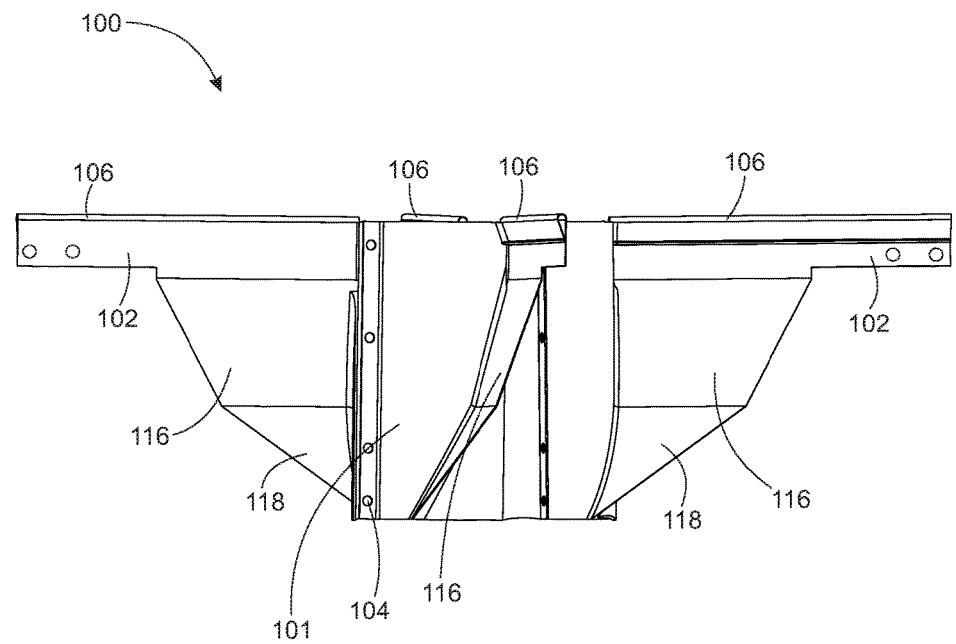
FIG. 2 is a side view of a flow-directing motor mount, in accordance with an embodiment.

FIG. 2 is a perspective view of a flow-directing motor mount. FIG. 2 shows support 102 and flow director 116 coupled to base 101. FIG. 2 additionally shows bracket angle 110 of support bracket 103 coupled to support 102. Two fastener holes 104 are also shown. Additionally shown in FIG. 2 is a leading edge 106 of support 102. Support 102, in some embodiments, comprises leading edge 106. Leading edge 106 is the first element of motor mount 100 to contact an air flowing in the air stream. Accordingly, in some embodiments, leading edge 106 may be formed of a folded over portion of the support 102 and may comprise a shape that tends to preserve laminar air flow and minimize turbulence within the fluid stream. In some embodiments, such as the embodiments shown in FIGS. 1 and 2, for example, leading edge 106 comprises an airfoil shape, a convex curvature, or the like, however this is not meant to be limiting.

Figure 3:
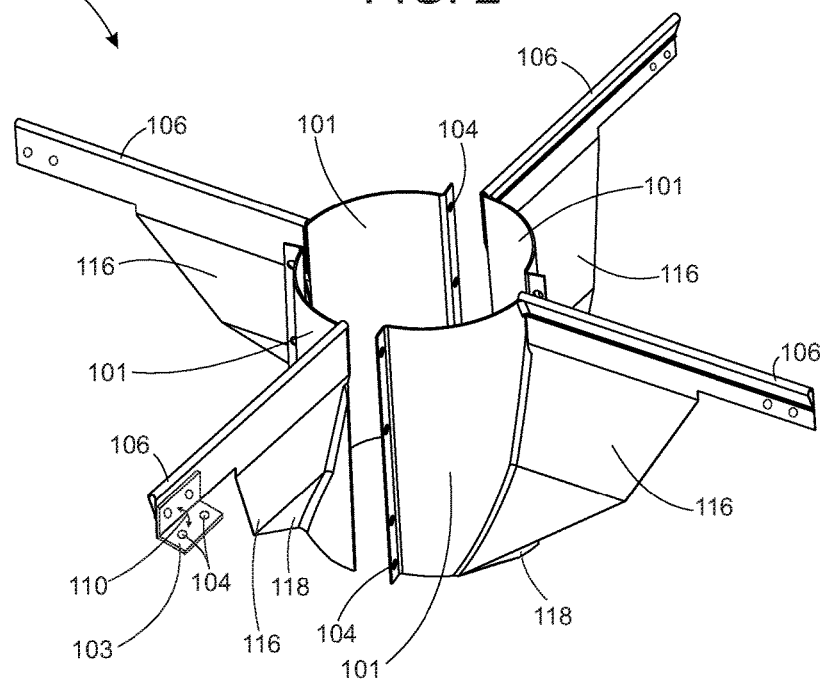
FIG. 3 is an additional perspective view of a flow-directing motor mount, in accordance with an embodiment.
Figures 6, 7:
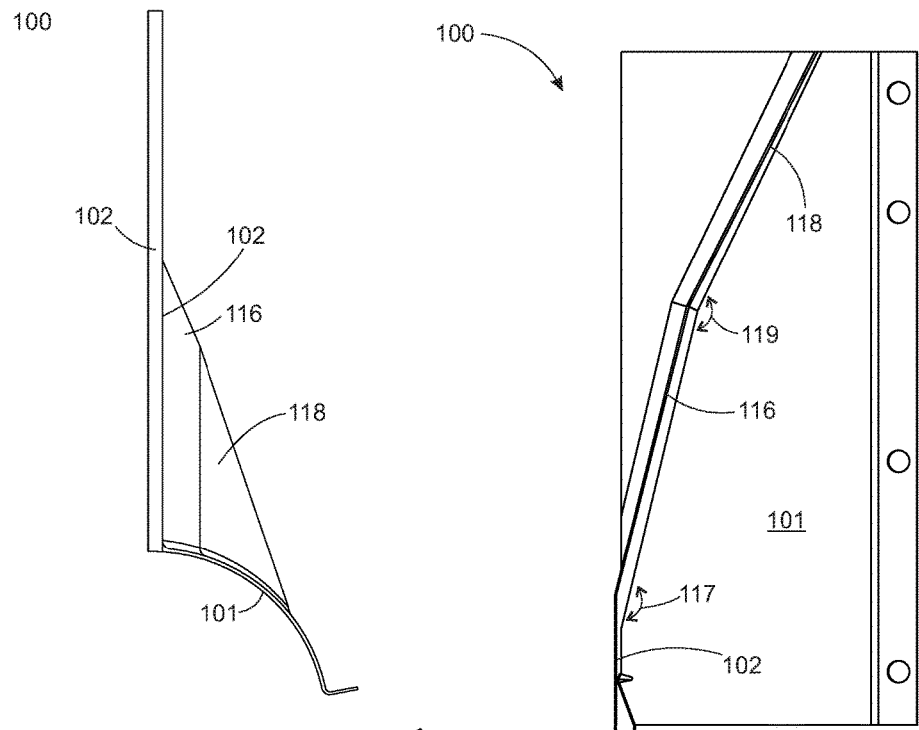
FIG. 6 is an end view of a segment of a flow-directing motor mount, in accordance with an embodiment.
FIG. 7 is a top view of a segment of a flow-directing motor mount, in accordance with an embodiment.

FIG. 3 is an additional perspective view of a flow-directing motor mount. FIG. 3 shows an embodiment of motor mount 100 comprising five supports 102 and five first flow directors 116 that extend from the folded over portion of the supports 102. As shown by FIG. 6, supports 102 are spaced at about equidistant intervals or otherwise equally distributed around a perimeter or circumference of a generally circular cylindrical base 101. This is not meant to be limiting. In some embodiments, a plurality of supports 102 are coupled to base 101 at intervals that are not about equidistant. In some embodiments, a plurality of supports 102 are symmetrically coupled to base 101. In some embodiments, a plurality of supports 102 are asymmetrically coupled to base 101. Also shown by FIG. 3 is detail of base 101, in a non-limiting example embodiment, wherein base 101 is a "sleeve" which slides over the exterior housing of a motor. Base 101 is subsequently compressed over the motor by tightening fasteners (not shown) spanning the small gap shown in the perimeter of base 101, wherein the motor is rigidly held in place by friction between base 101 and the exterior motor housing.

Figure 4:
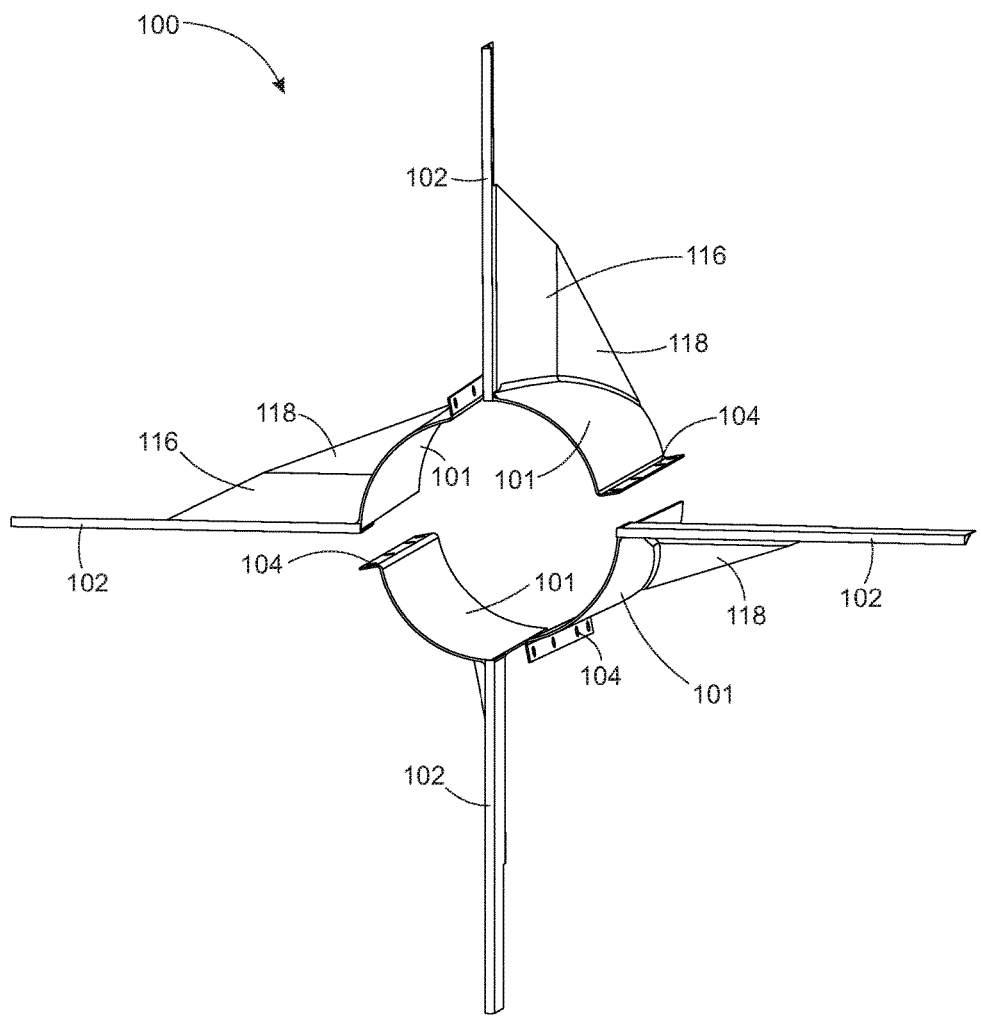
FIG. 4 is a perspective view of a flow-directing motor mount, in accordance with an embodiment.
Figure 5:
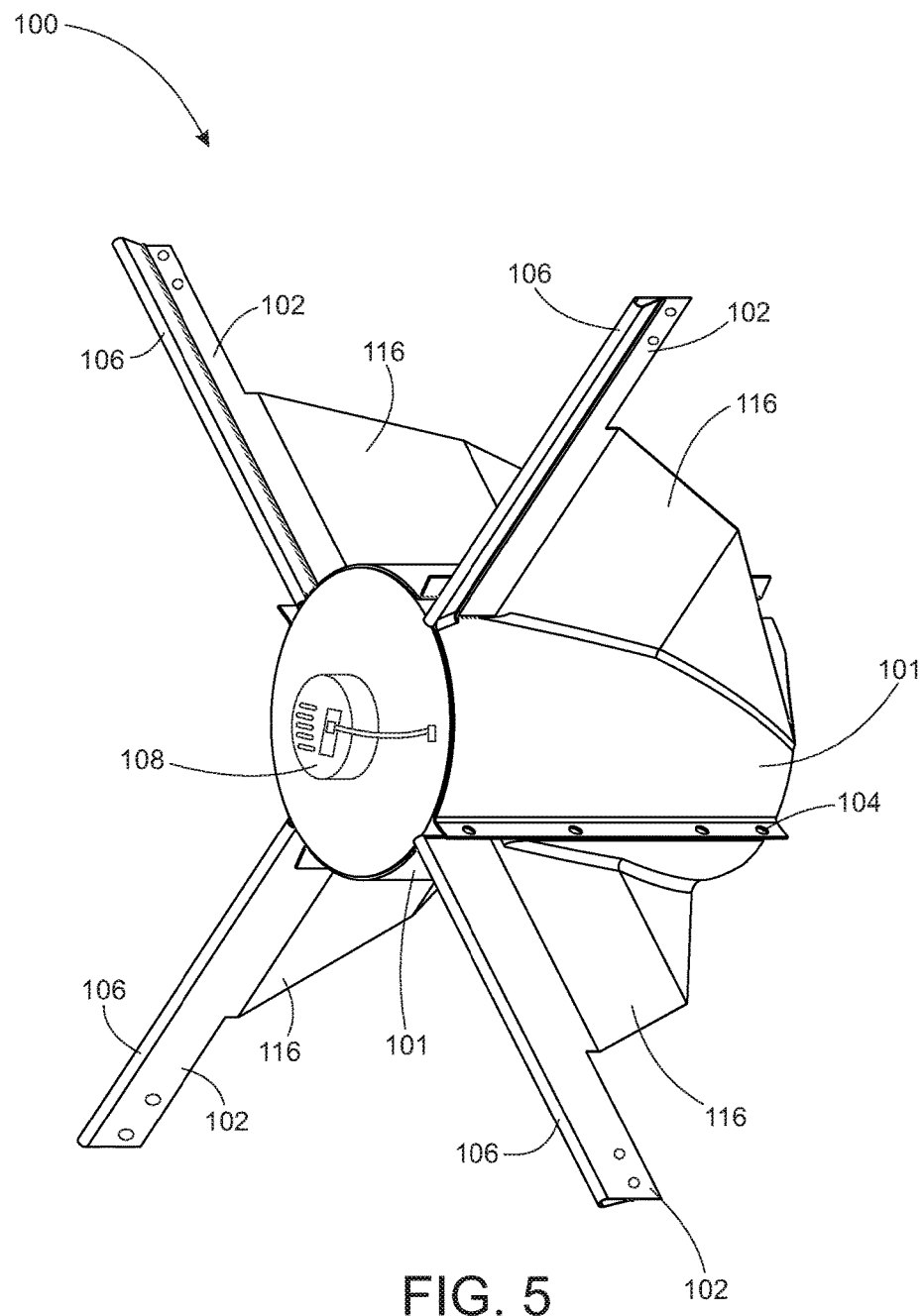
FIG. 5 is a perspective view of motor coupled to a flow-directing motor mount, in accordance with an embodiment.

FIG. 4 is a perspective view of a flow-directing motor mount and FIG. 5 is a perspective view of a motor coupled within the flow-directing motor mount. FIG. 5 shows a motor 108 mounting within motor mount 100, surrounded by a plurality of supports 102. An air stream F is shown, with the arrowhead indicated the direction of flow of an air stream F. As shown in FIG. 4, leading edges 106 of supports 102 encounter air stream F and direct air stream F over a plurality of flow directors 116. FIG. 4 also shows an air intake cone 112. Air intake cone 112 (see FIG. 1) is not an element of motor mount 112, in some embodiments. In some embodiments, air intake cone 112 is an element of motor mount 100. In the non-limiting example embodiment shown in FIG. 4, air intake cone 112 functions as a baffle, bounding air stream F as the air passes over and past motor mount 100.

In some embodiments of motor mount 100 wherein bracket angle 110 (see FIG. 1) is about ninety degrees, leading edge 106 and support 102 do not appreciably change the direction of air stream F. In some embodiments of motor mount 100 wherein bracket angle 110 is less than about ninety degrees, leading edge 106 and support 102 causes a change in the direction of air stream F corresponding to the size of bracket angle 110, as air stream F approaches air intake 112 and encounters leading edge 106 of support 102. This change in the direction of air stream F generates an angular momentum of air stream F as air stream F enters and is constrained within the boundaries of air intake 112. In some embodiments wherein the angular momentum is in the same angular direction as the direction of rotation of a fan blade (not shown) powered by motor 108, an operating efficiency of the HVAC device is increased, tending to offset the resistance effects of support 102 to air stream F that decrease the operating efficiency of the HVAC device.

Motor mount 100, in some embodiments, therefore, is a flow-directing motor mount 100 that increases the overall operating efficiency of a HVAC device, wherein the HVAC device comprises motor mount 100 and motor 108 positioned within air stream F flowing through the HVAC device. Some non-limiting, examples of such HVAC devices include air handlers, cooling fans, evaporative coolers, other heating ventilation and air conditioning equipment, and the like. The increased operating efficiency is generated by multiple elements of motor mount 100 changing the angular momentum of air stream F to correspond with a direction of rotation of a powered fan blade, including some or all of leading edge 106, bracket angle 110, support 102, and first flow director 116, in some embodiments.

FIG. 6 is a bottom end view of a segment of a flow-directing motor mount. FIG. 6 shows a segment of base 101 of motor mount 100 coupled to support 102. Support 102 is, in turn coupled to first flow director 116. First flow director 116 is, in turn, coupled to a second flow director 118. Second flow director 118, in some embodiments, causes an additional change in the angular momentum of air stream F as air stream F flows over first flow director 116 and subsequently over second flow director 18. Some embodiments of motor mount 110 comprise second flow director 118. Some embodiments of motor mount 110 do not comprise second flow director 118. In some embodiments, second flow director 118 is immovably coupled to first flow director 116. In some embodiments, second flow director 119 is moveably coupled to first flow director 116. In some embodiments, second flow director 118 is removably coupled to first flow director 116. In some embodiments, second flow director 118 is fixedly coupled to first flow director 116. In some embodiments, second flow director 118 and first flow director 116 comprise a unitary body. In some embodiments, first flow director 116 and second flow director 118 are formed from similar materials. In some embodiments, first flow director 116 and second flow director 118 are formed from dissimilar materials. In some embodiments, second flow director 118 is fixedly coupled to base 101. In some embodiments, second flow director 118 is not coupled to base 101.

As air stream F (see FIG. 4) sequentially encounters first support 102, then first flow director 116 and then second flow director 118, the angular momentum of air stream F is changed. In some embodiments, including the example shown in FIG. 6, the angular momentum is in a clockwise direction as taken from the bottom end view of FIG. 6. This is not meant to be limiting; in some embodiments, angular momentum of air stream F is changed in a counter-clockwise direction. The direction of change in the angular momentum of air stream F corresponds to the direction of rotation of a fan blade of a HVAC device, in some embodiments, wherein the change in angular momentum of airstream F causing an increase in the magnitude of air stream F per unit of time through the HVAC device, wherein the operational efficiency of the HVAC device is increased.

FIG. 7 is a side view of a flow-directing motor mount. FIG. 7 shows a support 102 coupled to a first flow director 116 at a first angle 117. First angle 117, in some embodiments, is an angle between two planar surfaces comprising support 102 and first flow director 116. In some embodiments, however, support 102 comprises a first curved surface with a first radius of curvature (not shown). In some embodiments, second flow director 118 comprises a planar surface. In some embodiments, second flow director 18 comprises a second curved surface with a second radius of curvature (not shown). Bracket angle 110 (see FIG. 1 and FIG. 2), first angle 117 and second angle 119 each increase the angular momentum of air stream F, in some embodiments. As shown in FIG. 7, first flow director 116 and second flow director 118 will change the direction of air stream F to the right of the figure. In some embodiments wherein bracket angle 110 is less than ninety degrees, support 102 additionally will cause a change in the direction of air stream F to right of the figure. A change in the direction of air stream F imparts angular momentum to air stream F. Wherein this angular momentum is in the direction of rotation of a fan blade, the overall efficiency of a HVAC device moving air is increased.

Figure 8:
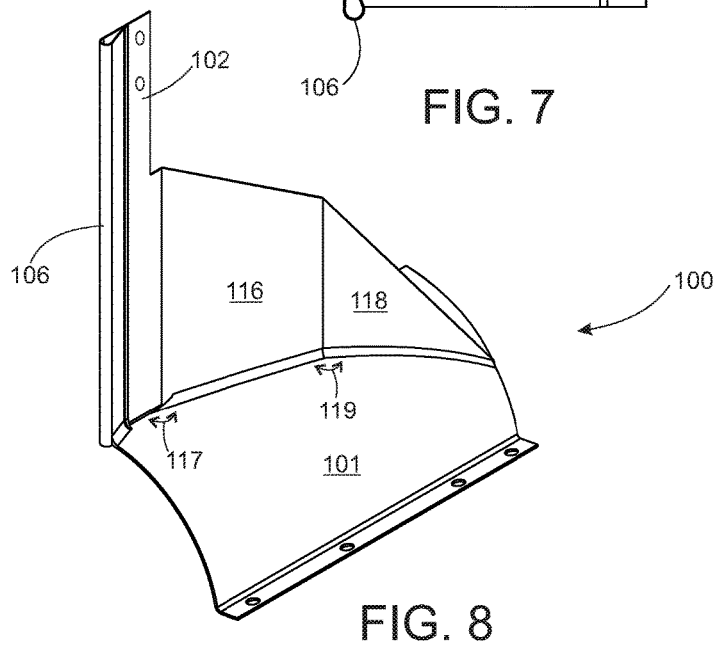
FIG. 8 is a perspective view of a segment of a flow-directing motor mount, in accordance with an embodiment.

FIG. 8 is a perspective view of a segment of a flow-directing motor mount. FIG. 8 shows leading edge 106, support 202, first flow director 116 and second flow director 118 couple to base 101. The direction of air stream F is changed as air stream F encounters leading edge 106, support 102, first flow director 16, and second flow director 118, creating an angular momentum toward the right of base 101. In some embodiments, first flow director 116 is pivotally coupled to support 102 and not fixedly coupled to base 101 wherein first angle 117 is adjustable, such as being continuously adjustable or incrementally adjustable. In some embodiments, second flow director 118 is pivotally coupled to first flow director 117 and not fixedly coupled to base 101 wherein second angle 119 is adjustable. In some embodiments, second angle 119 is incrementally adjustable. In some embodiments, second angle 119 is continuously adjustable.

During experimentation with some embodiments of flow-directing motor mount 100 wherein motor mount 100 was used to couple an electric motor within the air intake baffle of a fan assembly, an overall increase of efficiency of between 15% and 20% was observed. This observed increase in efficiency more than completely offset an increased number of supports such that dampening of resonant vibrations was possible without sacrificing operating efficiency of the HVAC device.

A flow-directing motor mount is described. Embodiments of the flow-directing motor mount cause a change in the direction of flow of an air stream, constrained by an air intake cone or baffle, flowing through a HVAC device, in some embodiments. The change in direction of flow creates an angular momentum in the air stream, increasing the overall operating efficiency of the HVAC device. By increasing the operating efficiency, the resistance created by the flow-directing motor mount supports coupling a motor to the HVAC device is offset, enabling the HVAC device to operate at a higher efficiency.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A flow-directing motor mount comprising:
   a base configured to mount a motor within the base; and
   a support coupled to the base and coupled to a HVAC device, the support extending into an air flow directed into an air intake, wherein the support comprises:
      a leading edge formed from a folded over portion of the support to create and airfoil shape; and a first flow director extending from the folded over portion and into an air intake cone of the air intake, wherein the first flow director directs the flow of air through a baffle of the HVAC device.

2. The flow-directing motor mount of claim 1, wherein the first flow director extends at a first angle from the folded over portion.

3. The flow-directing motor mount of claim 2, wherein the first flow director directs the flow of air at an angle toward a fan of the HVAC device.

4. The flow-directing motor mount of claim 2, wherein the support comprises a second flow director, wherein the second flow director extends at a second angle from the first flow director.

5. The flow-directing motor mount of claim 4, wherein the first flow director and second flow director direct the flow of air at an angle toward a fan of the HVAC device.

6. The flow-directing motor mount of claim 1, wherein the leading edge preserves laminar air flow and minimizes turbulence of a flow of air directed through the flow-directing motor mount.

7. The flow-directing motor mount of claim 1, wherein the base is a circular cylindrical base.

8. The flow-directing motor mount of claim 7, wherein the support extends radially from an outer surface of the circular cylindrical base.

9. The flow-directing motor mount of claim 7, wherein a motor is coupled within the circular cylindrical base and the support is coupled to the HVAC device.

10. A flow-directing motor mount comprising:
    a circular cylindrical base, the base receiving and retaining a motor within the base; and
    a plurality of supports coupled to and extending radially from the base, the plurality of supports coupled to a HVAC device, the support extending into an air flow directed into an air intake and the base and motor located within an air intake cone, wherein each support comprises:
    a leading edge formed from a folded over portion of the support, the folded over portion forming an airfoil shape; and
    a first flow director extending from the folded over portion, wherein the first flow director directs the flow of air through a baffle of the HVAC device.

11. The flow-directing motor mount of claim 10, wherein the first flow director of each support extends at a first angle from the folded over portion.

12. The flow-directing motor mount of claim 11, wherein the first flow director of each support directs the flow of air at an angle toward a fan of the HVAC device.

13. The flow-directing motor mount of claim 11, wherein each support comprises a second flow director, wherein the second flow director extends at a second angle from the first flow director.

14. The flow-directing motor mount of claim 13, wherein the first flow director and second flow director of each support direct the flow of air at an angle toward a fan of the HVAC device.

15. The flow-directing motor mount of claim 10, wherein the leading edge of each support preserves laminar air flow and minimizes turbulence of a flow of air directed through the flow-directing motor mount.

16. The flow-directing motor mount of claim 1, wherein each support extends radially from an outer surface of the circular cylindrical base, and each support is equally distributed around a circumference of the circular cylindrical base.

* * * * *